D. M. & F. R. BROCKWAY.
TRANSFORMABLE AUTOMOBILE TRACTOR.
APPLICATION FILED MAR. 25, 1916.
1,388,148.
Patented Aug. 16, 1921.
2 SHEETS—SHEET 2.
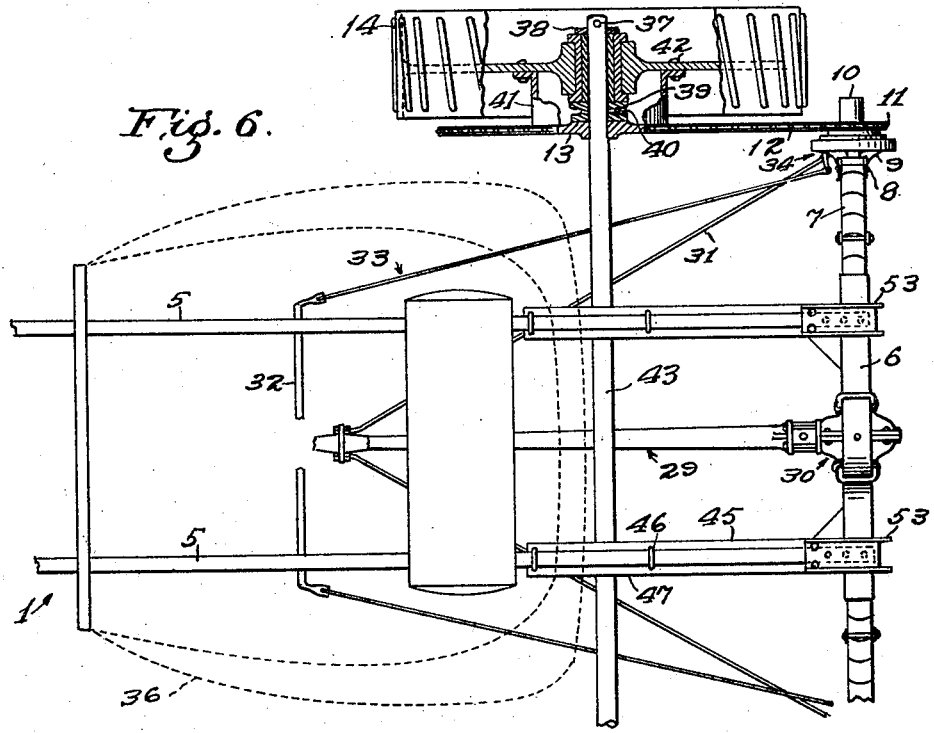
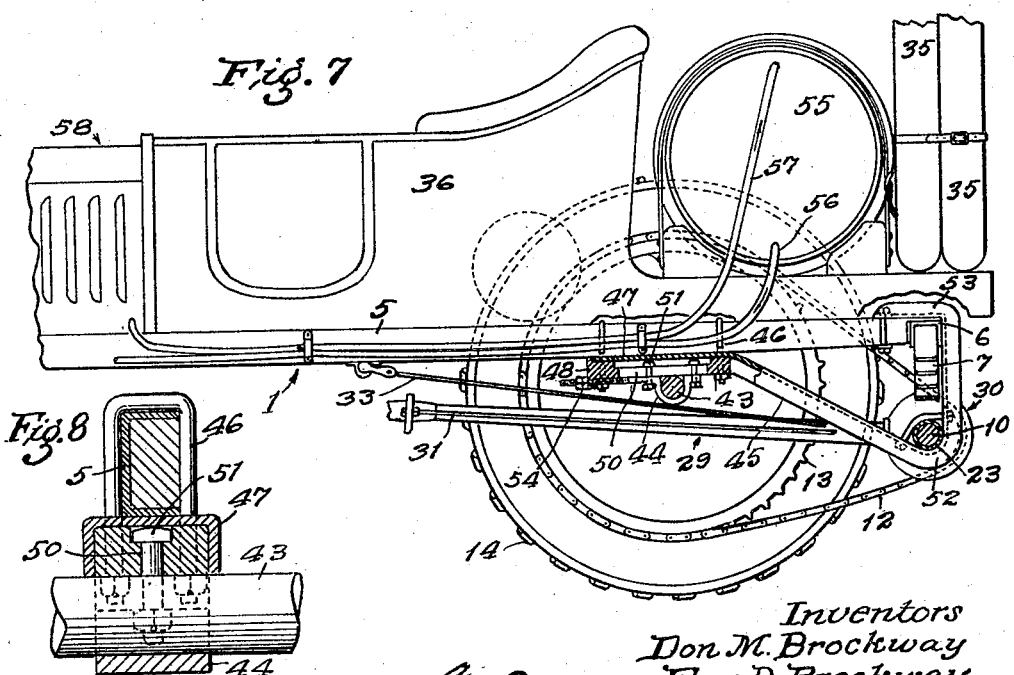

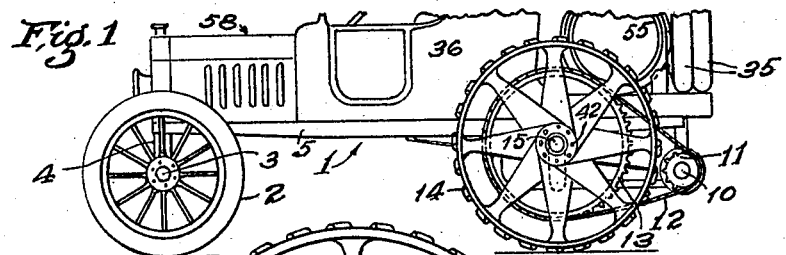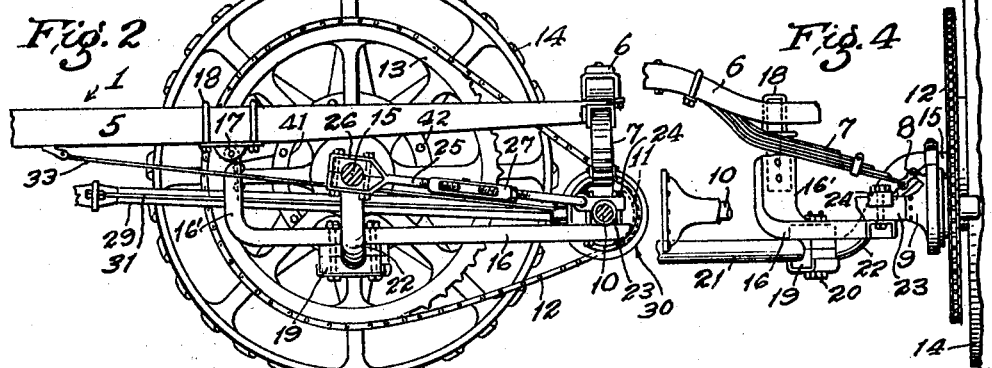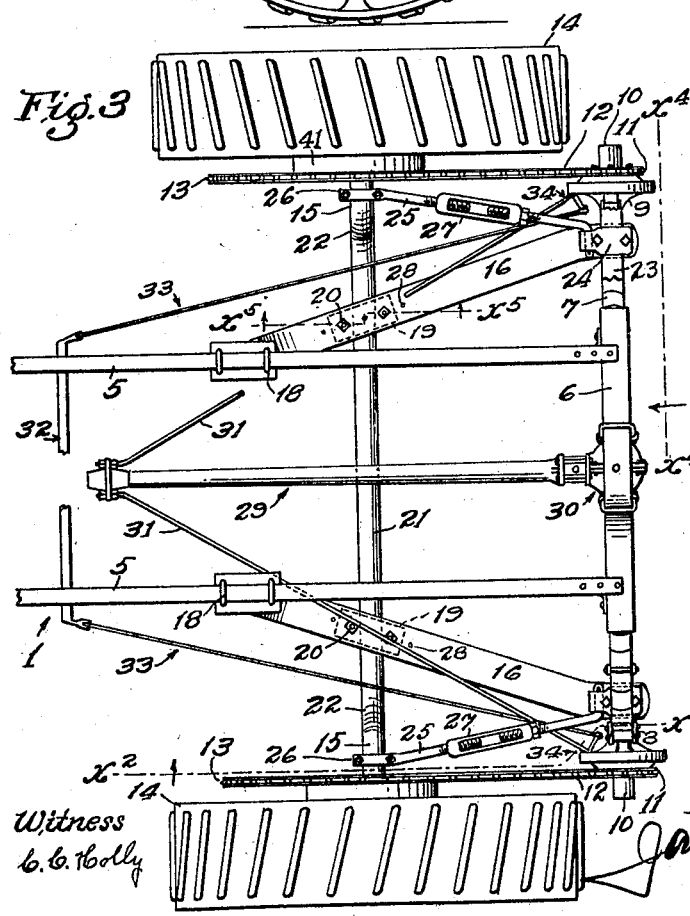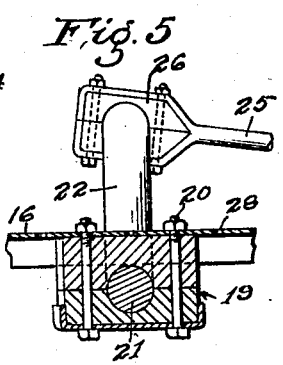

UNITED STATES PATENT OFFICE.

DON M. BROCKWAY AND FOSS R. BROCKWAY, OF LOS ANGELES, CALIFORNIA.

TRANSFORMABLE AUTOMOBILE-TRACTOR.

1,388,148.        Specification of Letters Patent.     Patented Aug. 16, 1921.

Application filed March 25, 1916. Serial No. 86,816.

*To all whom it may concern:*

Be it known that we, DON M. BROCKWAY and FOSS R. BROCKWAY, citizens of the United States, residing at Los Angeles, in the county of Los Angeles and State of California, have invented a new and useful Transformable Automobile-Tractor, of which the following is a specification.

This invention relates to a device that is transformable in a practical way by the simple addition and subtraction of parts to constitute a tractor in one instance, and an automobile in another instance.

An object of the invention is to provide a novel attachment adapted for convenient application to the rear part of an automobile frame or chassis, for the purpose of substituting tractor wheels for the automobile traction wheels and that will bring the same into practical coöperation with the power transmission of the automobile so that the power of the automobile may be applied through low gear for driving the tractor wheels at low speed with high power.

The invention comprises the combination with common structural automobile elements, of certain mechanism whereby the common automobile elements or parts can be made to do service as practical parts of the tractor.

An object is to provide means whereby the owner of an automobile may be able to transform the same into a tractor as occasion may require and may restore the automobile parts to their original use with very little loss of time and labor.

The invention comprises an attachment for an automobile whereby by the removal of the rear automobile wheels and the application of the attachment with tractor wheels, sprocket wheels and chains, the automobile is transformed into a tractor.

Further objects are cheapness, simplicity, strength and durability, and ready transformation from automobile to tractor and vice versa.

Other objects and advantages may appear from the accompanying drawings, and the subjoined detail description and claims.

The invention may be carried out in various ways and will be illustrated herein in two of the forms contemplated.

The invention may be applied with a straight-tractor axle or with a crank shaped tractor axle; and the crank or intermediate portions of the crank tractor axle may be arranged either below or above the level of the spindles of said crank tractor axle and above or below the chassis or automobile frame.

It is unnecessary to show all the forms and therefore only one arrangement of the straight tractor axle and one of the crank tractor axle and their hangers will be shown.

An object of the invention is to provide means whereby the tractor axle may be made to directly support the greater portion of a heavy load or weight to be carried by the tractor; and to allow such heavy weight or load to be carried by a chassis that is supported by the light spring common to automobiles.

The accompanying drawings illustrate the invention.

Figure 1 is a fragmental side elevation of a transformable automobile tractor exemplifying this invention as arranged for use as a tractor.

Fig. 2 is an enlarged sectional elevation showing more fully in detail, certain parts of the rear portion of the device shown in Fig. 1.

Fig. 3 is a fragmental plan on the scale of Fig. 2 of parts shown in Fig. 2.

Fig. 4 is a fragmental rear elevation from line $x^4$—$x^4$, Fig. 3.

Fig. 5 is a detail elevation in section on line $x^5$, Fig. 3.

Fig. 6 is a fragmental plan showing a transformable automobile tractor of another form omitting the detached automobile traction wheels.

Fig. 7 is a fragmental sectional elevation of the rear portion of a transformable automobile tractor of the form shown in Fig. 6.

Fig. 8 is a sectional detail of the shiftable tractor axle box shown in Figs. 6 and 7.

The automobile frame or chassis 1 is wheel-supported at one end in the usual manner having dirigible supporting wheels 2, only one of which is shown in Fig. 1, from the nature of the view. Said wheels are mounted on the dirigible axles 3 of usual construction connected to the frame 1 by the usual supporting means, including the springs 4.

The frame 1 as shown includes longitudinal rails 5 and a rear cross bar 6 connected to the rails 5 in any well-known manner and supported by springs 7 which are connected by the usual shackles 8 with the boxing 9 of the automobile driving rear axle 10.

Sprocket wheels 11 are detachably fixed to the automobile driving axle 10 in any suitable manner and are connected by sprocket chains 12 with sprocket wheels 13 fixed to tractor wheels 14 respectively that are journaled on the tractor axle 15, so that rotation of the automobile axle 10 will drive the tractor wheels 14 through the driving mechanism attachment 11, 12, 13.

The tractor axle is intermediate the ends of the automobile frame 1 and is adjustable therealong and relative to the first or driving axle 10.

The two axles are located at the rear or after part of the automobile frame and are alternatively adapted to be respectively supplied with the usual set of automobile traction wheels 35 or with the set of tractor wheels 14. Either set of wheels may be used, but not both sets at one time.

The forward second or tractor axle 15 is detachably and adjustably fixed to the automobile frame or chassis 1 by any suitable means. The means by which the forward or tractor axle is connected to the frame may be variously constructed. In Figs. 2, 3, 4 and 5 we have illustrated one form of hanger means for that purpose and in Figs. 6, 7, and 8 we have illustrated another form of hanger means for this purpose.

Referring now particularly to the form of construction shown in Figs. 2, 3, 4 and 5 the frame-supporting hangers are in the form of levers 16 and are provided with hinge means 17 that are fastened to the chassis rails 5, clip means 18 being provided for that purpose. Said clip means are adjustable along the frame and adjustably and detachably connect the hangers thereto. Said levers are provided intermediate their ends with fulcrum journal boxes 19 which are adjustably and detachably fastened by clip means 20 to the intermediate body or crank member 21 of the tractor axle 15.

Said intermediate crank member 21 is connected to the co-axial spindle members 15 of the shaft by bends 22. The forward arm 16' of the lever is connected by the hinge 17 and clip 18 to the chassis forwardly of the spindles 15, and the rear ends of said levers are arranged to support the automobile driving axle 10. This is effected in the form shown in Fig. 2 by extending the arm 16' underneath the housing 23 of the axle and connecting said housing thereto by the clip means 24, thus detachably connecting the hanger and the automobile driving axle together.

Said clips are connected by longitudinally adjustable stay means 25 with the spindles 15 by detachable journal boxes 26. The extensible stays are provided with suitable adjusting means as turn-buckles 27 by which said stays can be extended or contracted in order to move the spindles 15 farther away from or closer to the automobile driving shaft 10.

Journal boxes 19 are adjustably secured by clip bolts 20 to the lever supports 16, 16' which may be of channel iron along which the boxes 19 may be adjusted by removing the bolts 20 and replacing them in the adjusting holes 28.

The transformable automobile tractor is provided with the usual power transmission means indicated at 29, 30 supported by the usual braces 31 and the device is also provided with the usual brake mechanism 32, 33 and 34.

In practice when it is desired to transform the automobile into a tractor the rear axle will be jacked up by a jack, not shown, and the traction wheels 35 will be detached from the axle 10 and may be placed anywhere desired, as for instance at the rear of the tonneau 36.

The hangers 16, 16' will then be connected by their clips 18 and 24 to the automobile frame and the housing of the automobile driving axle 10. The tractor axle will be connected to the lever arm 16 by the boxes 19 and the adjustable stays 25 will be connected to the housing and to the spindles 15. Then the tractor wheels will be journaled on the outer ends of the spindles 15 and secured in the usual way. Linch-pins 37 and washers 38 on the outside of the tractor wheel, and machine collars 39 held by set-screws 40 on the inner sides of the wheels serve to hold the tractor wheels in place. The tractor sprocket-wheels 13 are fixed to a hub formed by a hollow pulley 41 fastened by rivets 42 to the tractor wheels 14. Said pulley 41 projects inwardly from the tractor wheels 14 giving clearance for the sprocket chains 12.

By adjusting the stays 25 the sprocket chains 12 may be tightened or loosened as required.

In order to re-transform the machine for immediate use as an automobile it is only necessary to detach the tractor wheels from the forward one of the two axles, and the detachable sprocket wheels 11 from the rear one of said two axles, and replace said sprocket wheels with the automobile wheels 35. This may be done with or without removal of the tractor axle and its appurtenances. By removing said tractor axle and the adjuncts thereto, after the traction wheels have been applied as above suggested, the automobile is restored to its original condition as such.

In the forms shown in Figs. 6, 7 and 8 the tractor axle 43 is straight from end to end and is adjustably connected by clip means 44 with hanger means 45.

Said hanger means 45 are in turn connected by clip means 46 to the automobile frame rails 5. Said hanger means 45 may be constructed of channel iron having a straight limb 47 in which an adjusting way formed by a block 48 is fixed by clips 46. Said block is provided with a slot 50 widened at the top to receive the heads of bolts 51 and adapted to allow the bodies of said bolts to slip along the slots 50 to adjust the tractor axle 43 backward or forward as the case may demand.

The hanger means 45 are constituted of two members each bent to form an angle 52 that constitutes a seat for the housing 23 of the automobile driving axle 10. The rear end of said hanger is extended from the angle 52 up in the form of a crook 53 extending over the cross-bar 6.

An adjusting device in the form of a nut-and-bolt 54 connected to the clip 44 and bearing against the slide 48, is provided so that by turning the nut 54 the clip or box 44 may be moved forward or back when the clips 46 are loosened for that purpose.

When the device is used for a tractor it is desirable that considerable weight be located above the tractor axle to hold the tractor wheels forcibly on the ground, and for this purpose we provide a detachable water tank 55 connected by pipes 56, 57 for a circulation of water through the radiator of the automobile engine 58 so that not only is the weight provided where required, but also an ample supply of water for the radiator is provided for desert and other use where it may be inconvenient to keep the radiator supplied with water.

In case a heavy load is to be supported by the heavy tractor wheels and axle, the axle may be located at such point along the lever-like hangers as to adjust the weight to the automobile springs. The farther the tractor axle is brought away from the rear spring and the closer to the direct connection of the lever with the chassis, the less will be the strain on the spring.

We claim:

1. The combination with an automobile frame and driving axle, of a tractor axle, tractor wheels thereon, a hanger hinged to the automobile frame and carried by the tractor axle; said hanger supporting the driving axle, and means connecting the driving axle to the tractor wheels to drive the same.

2. The combination with an automobile frame and driving axle, of a tractor axle, tractor wheels thereon, a hanger hinged to the automobile frame and carried by the tractor axle and supporting said frame and driving axle and means to drive the tractor wheels.

3. The combination with an automobile frame and an automobile driving axle therefor, of clip means adjustably connected to the frame, hanger means hinged to said clip means and extending beneath and supporting the driving axle, a tractor axle supporting the hanger, tractor wheels for the tractor axle, and means connecting the driving axle with the tractor wheels to drive the same.

4. The combination with an automobile frame and an automobile driving axle therefor, of clip means adjustably connected to the frame, hanger means hinged to said clip means and extending beneath and supporting the driving axle, a tractor axle supporting the hanger, tractor wheels for the tractor axle, and means adjustably connecting the tractor axle and driving axle.

5. The combination with an automobile frame and an automobile driving axle therefor, of clip means adjustably connected to the frame, hanger means hinged to said clip means and extending beneath and supporting the driving axle, a tractor axle supporting the hanger, tractor wheels for the tractor axle, and stays adjustable as to length connecting the tractor axle and the driving axle.

6. The combination with an automobile frame and driving axle therefor, of a crank shaft tractor axle having co-axial spindles, means connecting the crank portion between said spindles with the automobile frame, tractor wheels on said spindles, means connecting the driving axle with the tractor wheels to drive said wheels, and means for adjustably connecting the spindles with the driving axle.

7. The combination with an automobile frame and driving axle, of a crank tractor axle having co-axial spindles, detachable tractor wheels on the tractor axle spindles, a hanger carried by the crank portion of the tractor axle and supporting the automobile frame and driving axle, and detachable means for transmitting power from the driving axle to the tractor wheels.

In testimony whereof, we have hereunto set our hands at Los Angeles, California, this 14th day of March, 1916.

DON M. BROCKWAY.
FOSS R. BROCKWAY.

Witness:
JAMES R. TOWNSEND.